May 1, 1928.
J. F. RALEIGH
1,667,986
THEFT PREVENTING DEVICE
Filed April 16, 1925
2 Sheets-Sheet 1
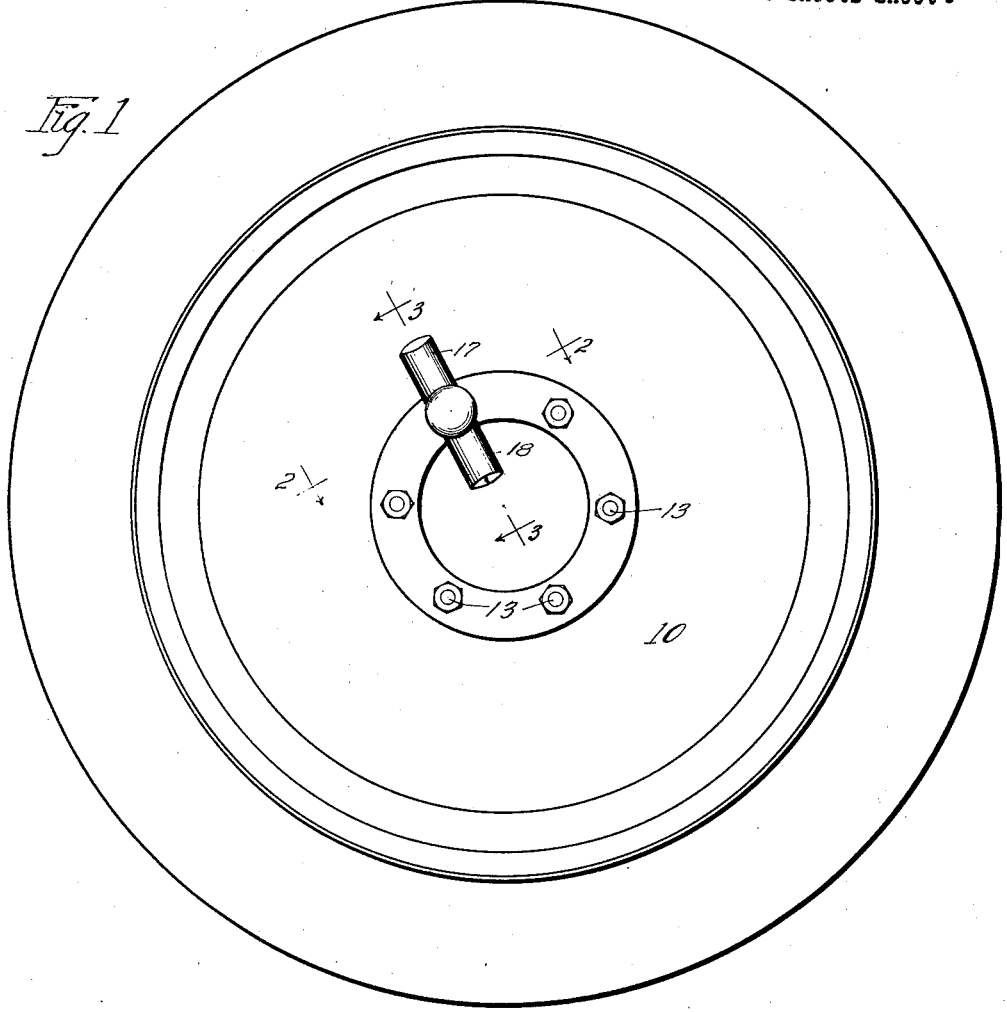
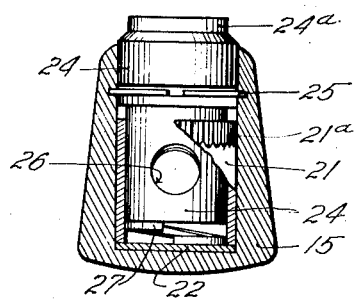
Inventor
James F. Raleigh
Williams, Bradbury,
McCaleb & Hinkle, Attys May 1, 1928.  
J. F. RALEIGH  
1,667,986  
THEFT PREVENTING DEVICE  
Filed April 16, 1925  
2 Sheets-Sheet 2
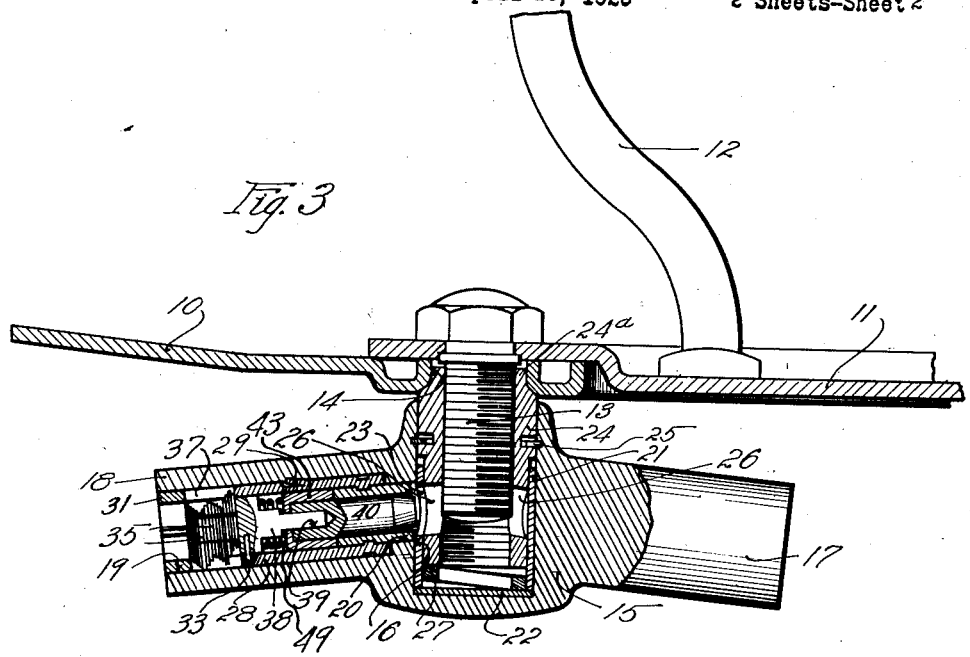
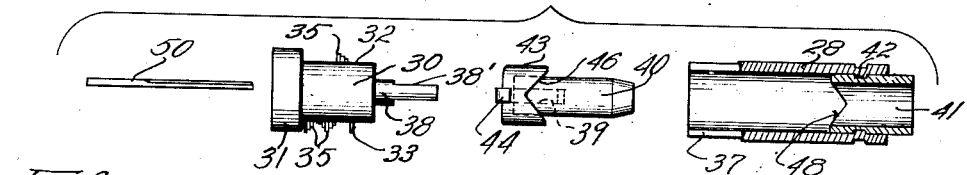
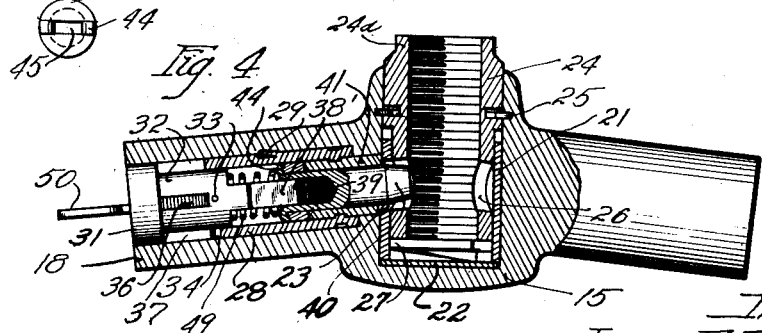
Inventor  
James F. Raleigh  
Williams, Bradbury,  
McCaleb & Hinkle,  
attys.

Patented May 1, 1928

1,667,986

UNITED STATES PATENT OFFICE.

JAMES F. RALEIGH, OF RIVER FOREST, ILLINOIS, ASSIGNOR TO PINES WINTERFRONT COMPANY, OF CHICAGO, ILLINOIS, A CORPORATION OF DELAWARE.

THEFT-PREVENTING DEVICE.

Application filed April 16, 1925. Serial No. 23,559.

My invention is directed to a theft preventing device, which, by application to a stud forming part of the carrier whereon a spare wheel is mounted, is adapted to prevent unauthorized removal of the said wheel from its carrier. The improvements of my invention, however, may be incorporated in devices for preventing the theft of objects other than the spare wheels of vehicles.

More specifically, my invention is concerned with certain improvements in that type of theft preventing device comprising a housing and an internally threaded sleeve rotatable within the housing, the sleeve being adapted to be locked to the housing when the device is applied to or removed from the carrier stud, but which, when applied to the stud and unlocked from the housing, is adapted to idle within the housing and thus prevent withdrawal of the device from the carrier stud.

Among its salient objects my invention contemplates:

First, the provision in a theft preventing device of the type mentioned of improved locking means comprising a spring-urged bolt which greatly facilitates the operation of removing the device from the carrier stud.

Second, the provision in a theft preventing device of the kind mentioned of improved means for preventing defeat thereof by the application of a piercing tool to the lock body for the purpose of causing the sleeve to move as an integer with the body at the time when it should idle therein.

Third, the provision in a theft preventing device of the kind mentioned of improved means for journalling and holding the rotatable sleeve within the housing, for braking its rotation to a certain extent and for preventing rattling of the several parts of the device.

Other features, objects and advantages of my invention will appear as the following detailed description progresses.

In the accompanying drawings:

Figure 1 illustrates my improved theft preventing device as it may be employed for preventing unauthorized removal of a conventional type of steel wheel from its carrier.

Fig. 2 is a cross sectional view taken on the line 2—2 of Fig. 1 looking in the direction indicated by the arrows.

Fig. 3 is an axial sectional view taken on the line 3—3 of Fig. 1 and looking in the direction indicated by the arrows, this view illustrating the bolt retracted from the rotatable sleeve.

Fig. 4 is a view illustrating the bolt occupying a recess in the rotatable sleeve.

Fig. 5 is an exploded view of the locking bolt and the parts of the lock mechanism in and by which it is operated, and Fig. 6 is an end view of the head of the locking bolt forming part of the mechanism.

Similar characters of reference refer to similar parts throughout the several views.

Indicated at 10 in Figs. 1 and 3 is a conventional type of steel wheel adapted to be supported by a spare wheel carrier 11. The carrier 11 is in the form of a plate adapted to be supported by an automobile frame or body in any suitable manner, as, for instance, by a plurality of struts one of which is illustrated at 12. The carrier 11 is provided with a plurality of stud bolts 13 disposed in circular formation. These stud bolts, as is usual, are adapted to extend through apertures 14 formed in the wheel adjacent the central opening thereof, these apertures 14 being the ones which, when the wheel is in use, receive the bolts by means of which the wheel is fastened to the hub part from which it is demountable. With the wheel mounted on the carrier, as shown in Figs. 1 and 3, suitable retaining nuts are applied to all of the stud bolts 13 save one, and to this last mentioned stud bolt is applied the theft preventing device of my invention, which I shall now describe.

The theft preventing device comprises a housing or body 15, conveniently formed of brass, which is provided with a blind bore 16 and with a pair of diametrically opposite integral arms 17 and 18. The arm 17 is solid or hollow, as desired. The arm 18 is formed with coaxial communicating bores 19 and 20 adapted to receive the bolt and lock mechanism presently to be referred to in some detail.

Rigidly retained within the aforesaid blind bore 16 are two elements 21 and 22 which I choose collectively to call a sleeve-armor. Each of these parts is preferably formed of case hardened steel. Element 21 is in the form of a hollow cylinder which is pressed into the blind bore 16 and is preferably provided with an annular milled area, 21ª, (Fig. 2) in order that this milled portion of the cylinder 21 may bite into the relatively softer metal of the body portion and thus hold the said cylinder against any kind of movement relative to the said body portion. Formed in the cylinder 21 is a single aperture 23 which registers with the aforesaid bore 20 of the handle 18. The element 22 of the sleeve-armor is in the form of a disk which lies against the blind end of the bore 16 to prevent a piercing tool, such as a drill or punch, from entering the bore 16 through the blind end thereof.

Journalled by the cylindrical element 21 of the sleeve-armor and by the open end of the bore 16 is a hollow internally threaded sleeve 24 which is preferably formed of case hardened steel and which has a portion 24ª which extends beyond the open end of the blind bore 16. Sleeve 24 is normally adapted to rotate in the body 15, but is held against withdrawal therefrom by a split ring 25 which occupies registering annular grooves formed in the inner surface of the body portion and the outer surface of the sleeve 24, respectively. In assembling the sleeve 24 with the other elements of the device, the split ring 25 is placed in the annular groove of the sleeve and is inserted into the said body portion with the sleeve until the said split ring expands out into the annular groove of the body. Thereafter the sleeve 24 is of course held against removal from the body, but is free to rotate therein, except when positively locked against such rotary movement by the means presently to be described. It will be noted that the rotatable sleeve 24 is provided with a pair of diametrically opposite apertures or recesses 26 either of which is adapted to be brought into registry with the before-mentioned aperture 23 of the member 21 of the sleeve-armor. It is not essential that the sleeve 24 be provided with two apertures 26, as illustrated. One of these would suffice. I prefer, however, to provide two of the apertures 26 in order that it never may be necessary to effect more than 180° of movement between the body and the sleeve 24 in order to permit these parts to be locked together by the spring bolt to which reference presently will be made.

I have found it desirable that some simple means be provided slightly to brake the rotary movement of the sleeve 24 within the housing 15 and also to take up any lost motion between the body 15, the sleeve 24 and the retaining ring 25. To accomplish these purposes, I insert a spring element 27 between the hardened disk 22 and the adjacent end of the rotatable sleeve 24. This spring element 27 is preferably in the form of one convolution of a helical spring,—one end of the convolution bearing against the sleeve 24 and the other end against the disk 22.

As the means for locking the rotatable sleeve 24 against rotary movement relative to the body 15 I prefer to provide a bolt which is normally spring-urged through the aperture 23 of the sleeve-armor 21 and against the cylindrical surface of the sleeve 24 ready to enter one of the sleeve apertures 26 when the latter is brought into register with the aperture 23. In conjunction with the bolt I prefer to employ any suitable form of pin tumbler lock mechanism which, by means of a suitable key, may be actuated to retract and hold the bolt away from the rotatable sleeve 24.

I shall now proceed to describe the bolt and its associated locking mechanism in some detail. Rigidly secured in the bore 19 of the handle 18 is a mounting sleeve 28. This sleeve is conveniently rigidly held in the bore 19 by being provided on its cylindrical surface with a lug 29 which permits the sleeve 28 readily to be forced into the handle 18 and which bites into the soft metal of the latter to prevent withdrawal of the mounting sleeve. Supported in the outer end of the mounting sleeve 28 is any suitable form of lock mechanism 30. In the particular embodiment herein shown, I have illustrated a pin tumbler lock, but it will be evident that I may use any other suitable form of locking mechanism. The type of pin tumbler lock which I have chosen to illustrate has an outer collar 31, preferably of case hardened steel which closes the outer end of the lock barrel. The sleeve 28 is preferably formed of case-hardened steel to prevent circumvention of the lock mechanism by sawing or drilling laterally through the arm 18. With the form of lock shown, the lock barrel 32 is adapted for rotation in the adjacent end of the mounting sleeve 28, said lock barrel having a pin 33 lying in a semi-circular slot 34 which is formed in the mounting sleeve 28 for the purpose of preventing withdrawal of the lock barrel from the said sleeve 28. The tumblers 35 project from diametrically opposite slots 36 in the lock barrel and are adapted to project into diametrically opposite slots 37 in the sleeve 28 for locking the barrel against rotation.

Projecting from the inner end of the lock barrel is a reduced shank 38 having its sides splayed off at the end to provide a flat-sided key portion 38' which projects into a correspondingly formed socket 39 formed in the reciprocating locking bolt 40. The locking bolt is guided for reciprocation in a small case-hardened steel guide sleeve 41 which is rigidly secured in the inner end of the mounting sleeve 28 and projects therefrom into the bore 20 of the handle 18 as is clearly illustrated in Figs. 3 and 4. For mounting the small guiding sleeve 41 in the mounting sleeve 28, the sleeve 41 may be provided with small sockets or apertures 42 into which the metal of the mounting sleeve 28 is punched, as is most clearly illustrated in Fig. 5. The locking bolt 40 is provided with a head 43 which is secured to the bolt by extending tongues 44 from the bolt up through the slot 45 in the end of the said head and by spreading these tongues outwardly, as is clearly illustrated in Figs. 5 and 6. At diametrically opposite points the head 43 is provided with V-shaped cams 46 which cooperate with similar V-shaped cams 48 formed in the adjacent end of the guide sleeve 41. A compression spring 49 encircling the shank 38 and confined between the lock barrel 32 and the bolt head 43 normally tends to project the bolt inwardly through the aperture 23 of the sleeve-armor and against the rotatable sleeve 24, or into one of its recesses 26 in case either of the latter is in registry with the aperture 23. The locking bolt assumes this inwardly projecting locking position when the V-shaped cams 46 register with the V-shaped cams 48 in the guiding sleeve 41. It will be apparent that upon rotating the lock barrel 32, through the instrumentality of a key 50, the cams 46 will ride up upon the high points of the cam surfaces 48 and withdraw the locking bolt back to the unlocked position shown in Fig. 3.

In the case of the lock herein illustrated, the normal position of the cam surfaces 46 and 48 is that relative position where they hold the locking bolt 40 retracted, as illustrated in Fig. 3. In other words, whenever the key is removed from the lock barrel, the pin tumblers 35 hold the bolt head 43 in its retracted position. Insertion of the key into the lock barrel and subsequent rotation of the lock barrel by the key will cause the cams 46 and 48 to take the positions wherein they permit the bolt 40 to move to its projected or sleeve engaging position under the influence of the spring 49.

I shall now describe how the theft preventing device of my invention is applied to the carrier stud bolt with which it cooperates and how it functions to prevent its unauthorized removal from such stud bolt when the key 50 is withdrawn, leaving the bolt 40 in the retracted position illustrated in Fig. 3.

Let it be assumed in the first instance that the locking bolt 40 is occupying the position illustrated in Fig. 4 and that the theft preventing device is to be applied to the carrier stud bolt. The sleeve 24 is now locked to the body 15 and may be threaded upon the stud bolt by manipulation of the handles 17 and 18. The sleeve 24 is threaded tightly up against the wheel 10,—so tightly, in fact, that it can be removed from the stud bolt only by applying considerable rotative force to the body handles. The key 50 is then manipulated to retract the bolt 40 to its normal position illustrated in Fig. 3, and the key is then withdrawn. Thereafter rotation of the body around the carrier stud bolt will have no tendency to move the sleeve 24 off of the said stud bolt. The sleeve merely idles within the body portion and is not affected by its rotation. Unnecessary turning of the body upon the sleeve 24 is normally prevented by the small but sufficient braking action of the spring 27 which also effectually prevents rattling.

The theft preventive device remains irremovable from the carrier stud bolt until the key is inserted into the locking mechanism and is actuated to cause the cams 46 and 48 to assume relative positions permitting the locking bolt 40 to be urged through the sleeve arm or aperture 23 and toward the rotatable sleeve 24. If at this time one of the openings 26 of the rotatable sleeve is in registry with the aperture 23, the bolt will enter such opening 26 and thus lock the rotatable sleeve to the body. In most cases, however, neither of the openings 26 will be in registry with the aperture 23. In this event the spring-pressed plunger bears resiliently against the cylindrical surface of the sleeve 24 until the body has been turned on the sleeve an amount sufficient to bring the aperture 23 into registry with one of the sleeve openings 26. Thereupon the bolt will enter the said sleeve opening 26 and lock the sleeve to the body. The theft preventing device may now be removed from the carrier stud bolt since the sleeve 24 will now rotate under force applied to the handles of the body.

While I have described in more or less detail the construction and mode of operation of a type of locking mechanism which I prefer to employ for the purpose of retracting and holding the yielding bolt away from the rotary sleeve, it should be understood that various other types of locking mechanism may be employed to accomplish the same result.

While I have illustrated my invention as applied to the prevention of unauthorized removal of a spare wheel from its carrier, I appreciate that other applications of my invention may be made.

What I claim is new and desire to secure by Letters Patent of the United States is:

1. A theft preventing device comprising a body having a sleeve-receiving bore therein, an internally threaded sleeve, having a cylindrical outer surface, rotatable in said body but held against removal therefrom, a recess formed in the cylindrical surface of said sleeve, a bolt carried by the body portion adapted to enter said recess, said bolt being capable of both rotary and reciprocating movements in said body, spring means adapted to urge said bolt against the cylindrical surface of said sleeve and into said recess when the latter is in registry with the bolt, means effective by rotation of the bolt to retract the bolt from said recess in opposition to said spring means and lock mechanism carried within the body for rotating said bolt.

2. A theft preventing device comprising a body having a blind bore therein, a sleeve-armor occupying said bore, said sleeve-armor comprising a hardened hollow member having an aperture in its wall, an internally threaded hollow sleeve rotatable in said sleeve-armor and held against removal therefrom, a recess in the cylindrical surface of said sleeve adapted to be brought into registry with the aforesaid aperture, a bolt carried by the body adapted to extend through said aperture and engage in said recess, spring means adapted to urge said bolt through said aperture and into said recess when the recess and aperture are in registry, and lock mechanism carried by the body for retracting and holding said bolt out of said recess.

3. In a theft preventing device of the type comprising a body and an internally threaded sleeve rotatable therein and held against withdrawal therefrom, a recess in the cylindrical surface of said sleeve, a spring-pressed bolt movable in the body adapted to enter said recess, said bolt being capable of both rotary and reciprocating movements in said body, means effective by rotation of the bolt to retract it from said recess and lock mechanism adapted when actuated to rotate the bolt.

4. A theft preventing device comprising a body provided with a blind bore, an armor lining for said bore comprising hollow-cylindrical and disc-shaped elements of hardened steel lying adjacent the cylindrical surface and blind end of said bore, an internally threaded sleeve rotatable in said armor lining and held against withdrawal therefrom, an aperture in the armor lining and a recess in the said sleeve adapted to be rotated into registry, a bolt movable in the body adapted to extend into said aperture and recess when the same are in registry, and locking mechanism adapted to retract and hold said bolt away from said sleeve.

5. In a theft preventing device, a body, an internally threaded sleeve rotatable in said body but held against withdrawal therefrom, a recess in said sleeve, a bolt carried by the body adapted to enter said recess, said bolt being capable of both rotary and longitudinal movements, means adapted yieldingly to urge said bolt into engagement with said sleeve and into said recess when the latter is in registry with the bolt, cam means effective by rotation of the bolt to retract same against the pressure of the urging means and lock mechanism for rotating said bolt.

6. A theft preventing device comprising a body portion provided with a blind bore and with an operating handle disposed at one side of said bore, a hollow cylindrical sleeve armor member fixed in said bore and provided with an aperture in line with said handle, a sleeve rotatably mounted in said sleeve armor and comprising a portion projecting somewhat from said blind bore, registering annular grooves formed in the sleeve and body, a split ring occupying said grooves and preventing withdrawal of the sleeve from the sleeve armor without preventing relative rotary movement between the sleeve and sleeve armor, a recess in the cylindrical surface of said sleeve adapted to register with the aforesaid aperture in the sleeve-armor, a bolt operating in said handle, spring means associated with said bolt and normally urging the same through the sleeve-armor aperture and into engagement with said sleeve, and lock mechanism also carried by said handle adapted to be operated to retract said bolt away from said sleeve to permit said sleeve to idle in said body when the sleeve is tightly threaded upon a bolt with its projecting end tightly in engagement with an object to be held against unauthorized removal from such bolt.

7. A theft preventing device comprising a body having a blind bore therein, a sleeve-armor occupying said bore, said sleeve-armor comprising a hardened disk lying in the blind end of said bore, a hardened cylindrical member affording a bearing for the sleeve hereinafter mentioned, an internally threaded hollow sleeve rotatable in said sleeve-armor and held against removal therefrom, a bolt carried by the body adapted to engage said sleeve to cause the latter to move as an integer with such body, and lock mechanism carried by the body for holding said bolt out of engagement with said sleeve.

8. A theft preventing device comprising a body having a blind bore therein, a sleeve-armor occupying said bore, said sleeve-armor comprising a hardened hollow member affording a bearing for the sleeve hereinafter mentioned, an internally threaded hollow sleeve rotatable in said sleeve-armor and held against removal therefrom, a bolt carried by the body, said bolt adapted to engage said sleeve to cause the latter to move as an integer with said body, spring means urging said bolt into locking engagement with said sleeve, and lock mechanism carried by said body for holding said bolt out of engagement with said sleeve.

9. A theft preventing device comprising a body having a blind bore therein, a sleeve-armor occupying said bore, said sleeve-armor comprising a hollow member affording a bearing for the sleeve hereinafter mentioned, an internally threaded hollow sleeve rotatable in said sleeve-armor, and held against removal therefrom, a bolt carried by the body adapted to engage said sleeve to cause the latter to move as an integer with said body, and lock mechanism carried by the body for holding said bolt out of engagement with said sleeve.

10. A theft preventing device comprising a body having a blind bore therein, a hollow armor occupying said bore, said armor comprising a hardened cylindrical member having an aperture in its wall, a threaded member rotatable in said armor and held against removal therefrom, a recess in the cylindrical surface of said threaded member adapted to be brought into registry with the aforesaid aperture, a bolt carried by the body adapted to extend through said aperture and engage in said recess, spring means adapted to urge said bolt through said aperture and into said recess when the recess and aperture are in registry, and lock mechanism carried by the body for retracting and holding said bolt out of said recess.

In witness whereof, I hereunto subscribe my name this 11th day of April 1925.

JAMES F. RALEIGH.